Figure 1:
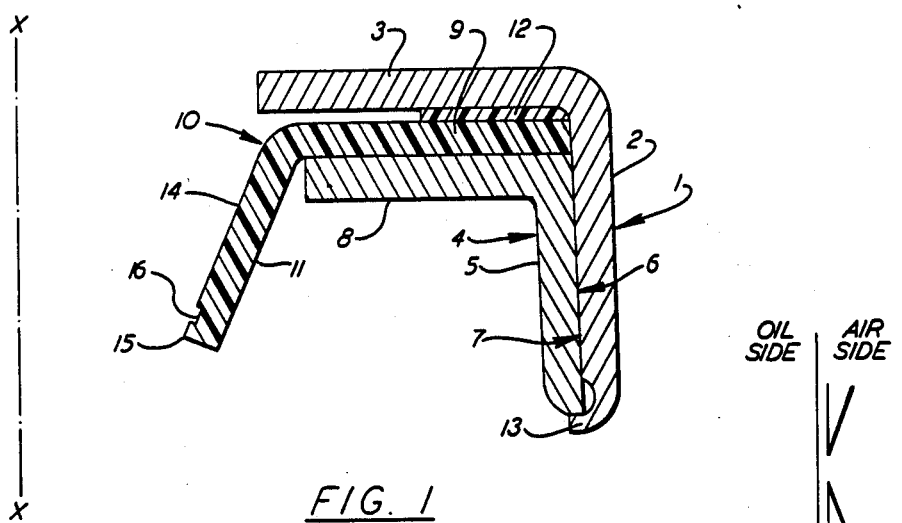

United States Patent [19]

Stanley

[11] Patent Number: 4,635,946
[45] Date of Patent: Jan. 13, 1987

[54] SEAL WITH SPACED RECESSES

[75] Inventor: Clive J. Stanley, Tewkesbury, England

[73] Assignee: Dowty Seals Limited, Gloucestershire, England

[21] Appl. No.: 808,540

[22] Filed: Dec. 13, 1985

Related U.S. Application Data

[63] Continuation of Ser. No. 506,298, Jun. 21, 1983, abandoned.

[30] Foreign Application Priority Data

Jul. 9, 1982 [GB] United Kingdom ............... 8220054

[51] Int. Cl.⁴ .............................................. F16J 15/32
[52] U.S. Cl. ................................. 277/134; 277/152; 277/215
[58] Field of Search ................. 277/134, 152, 153, 215

[56] References Cited

U.S. PATENT DOCUMENTS 3,572,730  3/1971  Otto et al. ........................ 277/96.1
3,586,342  6/1971  Staab ............................... 277/134
4,243,235  1/1981  Repella ............................ 277/152

FOREIGN PATENT DOCUMENTS 1468256 12/1966  France ............................ 277/134
1196451  6/1970  United Kingdom ............... 277/134
1215221 12/1970  United Kingdom .
1521740  8/1978  United Kingdom .
 679755  8/1979  U.S.S.R. ......................... 277/134

Primary Examiner—Robert S. Ward
Attorney, Agent, or Firm—Hayes, Davis & Soloway

[57] ABSTRACT

A seal for use between two relatively-rotatable parts includes a sealing member of fluorine resin having a side which terminates in an edge and which has a plurality of recesses adjacent to and disposed about the edge. Each groove is in the form of a quadrilateral with two opposite sides substantially parallel to the edge, one being longer than, and closer to the edge than, the other, and each of the other two sides being inclined at an acute angle to the longer of the two parallel sides. In use the edge and at least part of the side adjacent the edge are engageable with one of the two relatively-rotatable parts.

1 Claim, 3 Drawing Figures

SEAL WITH SPACED RECESSES

This is a continuation of co-pending application Ser. No. 506,298 filed on June 21, 1983, now abandoned.

This invention relates to seals which have sealing members of fluorine resin and which are intended for use between two relatively-rotatable parts. Examples of such seals are rotary shaft seals and rotary face seals. For convenience, the invention will be described with reference to rotary shaft seals.

Seals having sealing members of fluorine resin which are intended for use between two relatively-rotatable parts are known.

U.K. Patent Specification No. 1 494 214 discloses a rotary shaft seal which has an annular polytetrafluoroethylene (ptfe) sealing member. That sealing member has a radially-outer, annular, planar portion and a radially-inner, annular, shaft-sealing, non-planar portion which is inclined to the planar portion. The radially-inner portion has a shaft-engaging side (only part of that side may engage a shaft) with an inner edge which engages the shaft. The shaft-engaging side has a fluid-returning means in the form of a spiral groove which leads from the inner edge and which acts, hydrodynamically, to return fluid which has leaked beyond the inner edge of the shaft-engaging side.

Such a spiral groove is only effective to return fluid when the shaft which the seal engages is rotating in one direction. When the shaft rotates in the other direction, the spiral groove is ineffective, and any fluid which leaks past the inner edge is not returned.

U.S. Specification No. 3 984 113 discloses a seal, having a sealing member of ptfe, which is intended to return fluid which has leaked beyond the inner edge not only when the shaft is rotating in one direction but also when the shaft is rotating in the other direction.

To that end, the fluid-returning means on the shaft-engaging side of the ptfe sealing member includes a pair of spaced-apart, co-axial, projecting, circular ribs. One of the ribs lies adjacent the inner edge and the other of the ribs lies farther from the inner edge. The fluid-returning means also includes a series of curved, segmental ribs, each of which has a pair of ends, spaced towards the first-mentioned of the two ribs from the second-mentioned rib, and is curved between its ends towards the first-mentioned rib, extending to and intersecting that rib.

It is an object of this invention to provide a seal, intended for use between two relatively-rotatable parts, having a sealing member of ptfe, which has a fluid-returning means operative irrespective of the direction of relative rotation of the two parts to be sealed.

According to this invention, a seal for use between two relatively-rotatable parts includes a sealing member of fluorine resin having a side which terminates in an edge and which has fluid-returning means comprising a plurality of recesses adjacent to and disposed about said edge, each recess being in the form of a quadrilateral with two opposite sides substantially parallel to said edge, one being longer than, and closer to said edge than, the other, and each of the other two sides being inclined at an acute angle to the longer of the two parallel sides, and said edge and at least part of the side adjacent said edge, in use, being engageable with one of the two relatively-rotatable parts to be sealed.

Figure 2:
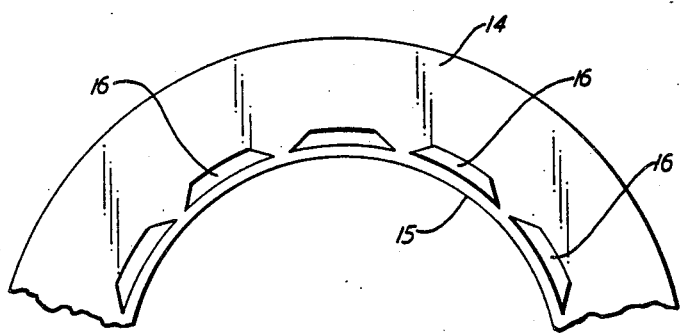
Figure 3:
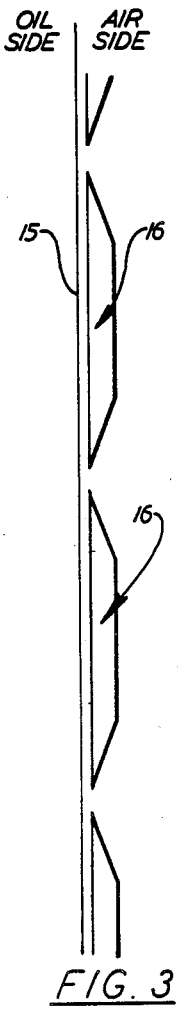

In the accompanying drawings,

FIG. 1 is a sectional view of a rotary shaft seal in accordance with an embodiment of the invention, FIG. 2 is a view of part of the shaft-engaging side of the sealing member of the seal, and FIG. 3 is a developed view of part of the interference pattern of the seal with a shaft.

Referring to the drawings, the rotary shaft seal, which is symmetrical about the axis X—X, includes an annular outer case 1 with cylindrical portion 2 and a radial flange 3. There is also an inner case 4 with a cylindrical portion 5 which nests in the cylindrical portion 2, so that the outer surface 6 of the portion 5 directly bears against the inner cylindrical wall 7 of the portion 2. The inner case also has a radial flange 8. Between the radial flanges 3 and 8 is a flat radial outer portion 9 of a seal element 10, made from fluorine resin, e.g. polytetrafluoroethylene. The seal element 10 also has a frustoconical portion 11.

A gasket 12 is, preferably, provided between seal element 10 and the radial flange 3, to ensure sealing between the seal element 10 and the case 1.

The radial flange 8 is forced toward the radial flange 3 so as to compress the portion 9, and hold it tightly, and to compress the gasket 12. The outer case 1 has an end portion 13 curled over to lock the inner case 4 tightly in position.

The inner portion 11 of the element 10 which, as mentioned above, is frustoconical in shape, has a side surface 14 which, when the seal is in use, will be the side of the seal exposed to air. The side surface 14 terminates in a sealing edge 15.

The side surface 14 has formed therein adjacent to, and disposed at equal intervals about, the sealing edge 15 fluid-returning means which comprises a plurality of recesses 16. As seen in FIG. 2, each groove has the shape of a quadrilateral with two of its opposite sides parallel, the one to the other. One of the parallel sides is longer than, and is closer to the edge 15 than, the other of the two parallel sides, being adjacent that edge. Each of the other two sides of the quadrilateral are of similar length and are inclined at an acute angle to the longer of the two parallel sides.

When used between two relatively-rotatable parts, one of which say is a rotating shaft, the outer case 1 will be held in a fixed housing and the sealing edge 15 of the side surface 14, and part of that side surface which is adjacent the sealing edge, will have an interference fit with the rotatable saft. The presence of the recesses 16 adjacent the edge gives an interference pattern with the shaft shown in FIG. 3. Irrespective of the direction of rotation of a shaft, any liquid which leaks under the sealing edge from the oil side of the seal to the air side will be moved by rotation of the shaft into and through one of the recesses. When it meets an inclined side of the recess, it will be channelled back to the oil side, since each inclined side forms, effectively, a sharp edge which is in engagement with the shaft.

I claim:

1. A seal for use as an oil to air seal between two relatively-rotatable parts and devoid of a garter spring including a sealing member of fluorine resin having an air side defined by a substantially continuous surface which terminates in a sealing edge and which has fluid-returning means comprising a plurality of recesses formed therein as circumferentially spaced depressions wholly sunken into said fluorine resin adjacent to and disposed about said edge, each recess being in the form of a quadrilateral with two opposite sides, defining with said air side opposed recess edges, substantially parallel to said edge, one being longer than, and closer to said edge than, the other, and each of the other two sides defining, with said air side opposed recess edges which are inclined at an acute angle to the longer of the two parallel sides, and said sealing edge and said quadrilateral recesses, in use, being engageable with one of the two relatively-rotatable parts to be sealed, said recesses being on the air side of the seal and being displaced from said sealing edge so that at said sealing edge a continuous uninterrupted annular band is formed with its mating relatively rotatable part, the broad base of the quadrilateral being closer to the oil side of the seal than is the narrow side.

* * * * *